Figure 1:
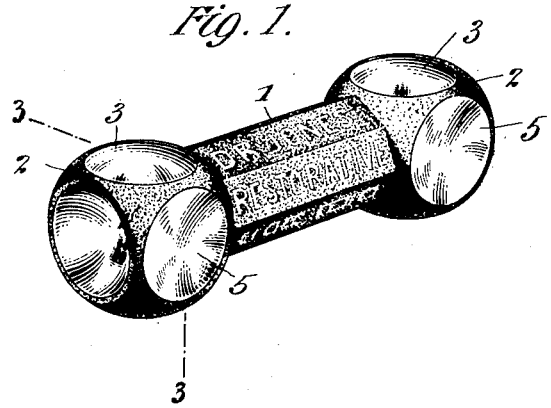

No. 874,049.

PATENTED DEC. 17, 1907.

J. L. BORSCH.

COMBINED PAPER WEIGHT, KNIFE REST, AND OPTICAL DEVICE.

APPLICATION FILED SEPT. 17, 1907.

Witnesses:

Inventor:
JOHN L. BORSCH
By his Attorneys

UNITED STATES PATENT OFFICE.

JOHN L. BORSCH, OF PHILADELPHIA, PENNSYLVANIA.

COMBINED PAPER-WEIGHT, KNIFE-REST, AND OPTICAL DEVICE.

No. 874,049.　　　　Specification of Letters Patent.　　　Patented Dec. 17, 1907.

Application filed September 17, 1907. Serial No. 393,396.

*To all whom it may concern:*

Be it known that I, JOHN L. BORSCH, a citizen of the United States, residing at Philadelphia, in the county of Philadelphia and State of Pennsylvania, have invented certain new and useful Improvements in a Combined Paper-Weight, Knife-Rest, and Optical Device, of which the following is a full, clear, and exact description.

My invention consists of a new article of manufacture which is preferably of the form shown in the drawings and is capable of various uses, such for instance, as a paper weight, knife rest, eye glasses, magnifying glass and telescope.

The device is preferably constructed of one integral piece of transparent material such as glass, and may be very cheaply manufactured by molding or pressing the glass into the desired shape.

Reference is made to the accompanying drawings, of which

Figure 2:
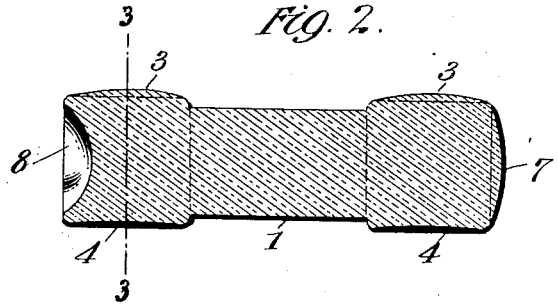

Figure 1 is a perspective view of the preferred form of device; Fig. 2 is a longitudinal section of the same; and Fig. 3 is a section on line 3—3 of Figs. 1 and 2.

The device shown is an elongated body 1 preferably of one integral piece of glass. The end portions 2 are enlarged and are provided with lens surfaces 3 and 4, the former being shown as convex and the latter as concave, thus forming a convexo-concave lens suitable for magnifying. These surfaces may be formed so as to constitute any kind of a lens, such as a double convex, double concave, plano-convex, plano-concave, concavo-convex or periscopic. The advantage, however, of using concave surfaces is that the device may rest upon a support in the position of Fig. 2, and the lens surfaces 4 will be protected against being scratched by the surface upon which they rest. The distance between the centers of the end portions 2 is preferably the average distance between the eyes of a person so that the device may be used as a pair of eye glasses.

Figure 3:
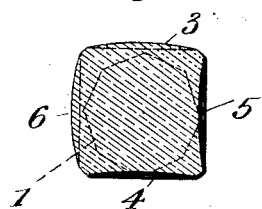

In the position of Fig. 3, the optical axes of the lenses formed by the surfaces 3 and 4 are vertical. The enlarged portions 2 are also provided with lens surfaces 5 and 6, the optical axes of which are horizontal when in the position of Fig. 3. These surfaces may also be made so as to form lenses of any desired shape. The ends of the body 1 are formed with lens surfaces 7 and 8, one of which is preferably convex and the other concave, as shown. The convex lens surface 7 acts as an object glass and causes the rays of light which fall thereon to converge, and the concave lens surface 8 acts as an eye-glass for magnifying the image formed by the lens surface 7, whereby a Galilean telescope is formed. Such portions of the surface of the body 1 as do not form lenses may be of ground glass. If desired advertising matter may be applied to the body 1 in any suitable manner, as by pressing the letters in the glass, etching, grinding, etc.

The article as thus constructed is a very useful one. It may be placed upon a desk and used as an ornamental paper weight; if the user desires a magnifying glass to enable him to read fine print or examine fine lines of a drawing, or take the place of eye glasses which he may have mislaid, he may take the article and use it as a pair of eye-glasses or may use either of its four magnifying lenses as a reading glass; or he may apply the device to his eye as a telescope for viewing distant objects.

The device may, of course, be made of any suitable size, and therefore, of any desired magnifying or telescopic power, within the limits which are imposed by the nature of the material used. One may also use the device to rest his pen upon to prevent it from soiling the top of the desk; or it may be used upon the dining table as a knife and fork rest. It is also useful as an attractive souvenir, and as an advertising medium.

Having now described my invention, what I claim is:

1. As a new article of manufacture, an elongated body having enlarged ends of transparent material, said ends having lens surfaces.

2. As a new article of manufacture, an elongated body having an enlarged end of transparent material, said end having lens surfaces the optical axis of which is transverse to the direction of elongation of the body.

3. As a new article of manufacture, an elongated body having an enlarged end of transparent material, said end having two sets of lens surfaces with optical axes transverse to the direction of elongation of the body and at right angles to each other.

4. As a new article of manufacture, an elongated transparent body having ends formed with lens surfaces adapted to coöperate with each other as a telescope.

5. As a new article of manufacture, an elongated transparent body having enlarged ends one of which is formed with a convex lens surface, and the other of which is formed with a coöperating concave lens surface.

6. As a new article of manufacture, an elongated transparent body having enlarged ends provided with lens surfaces, one set of surfaces being situated so that their optical axis is in the direction of elongation of the body and is adapted to act as a telescope, and the other set of surfaces having an optical axis transverse to the direction of the elongation of the body.

7. As a new article of manufacture, an elongated transparent body having ends formed with lens surfaces, the optical axes of which are parallel and separated by a distance suitable to enable the device to be used as a pair of eyeglasses.

In witness whereof, I subscribe my signature, in the presence of two witnesses.

JOHN L. BORSCH.

Witnesses:
MILLIE S. BAIRD,
HOWARD F. ABEND.